UNITED STATES PATENT OFFICE.

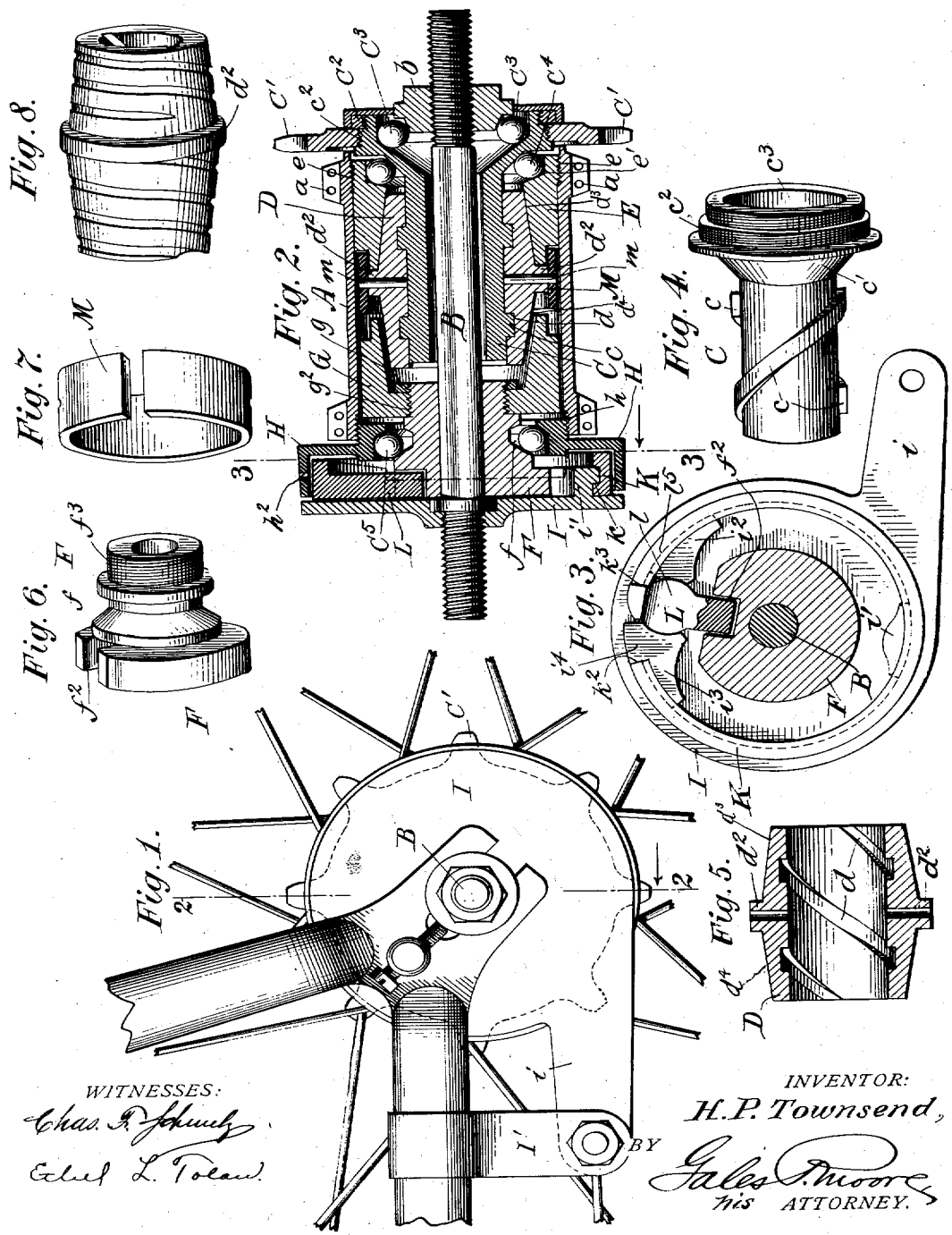

HARRY POND TOWNSEND, OF NEW BRITAIN, CONNECTICUT, ASSIGNOR TO THE NEW DEPARTURE MANUFACTURING COMPANY, OF BRISTOL, CONNECTICUT, A CORPORATION OF CONNECTICUT.

DRIVING AND BRAKING MECHANISM FOR CYCLES.

No. 850,077.  Specification of Letters Patent.  Patented April 9, 1907.

Original application filed October 10, 1898, Serial No. 693,117. Divided and this application filed April 26, 1906. Serial No. 313,800.

*To all whom it may concern:*

Be it known that I, HARRY POND TOWNSEND, a citizen of the United States, residing at New Britain, county of Hartford, State of Connecticut, have invented a certain new and useful Driving and Braking Mechanism for Cycles, of which the following is a full, clear, and exact description, such as will enable others skilled in the art to which it appertains to make and use the same, reference being had to the accompanying drawings, forming part of this specification.

The present invention relates to driving and braking mechanism for wheeled vehicles in general, and more particularly to an improved driving, coasting, and braking mechanism for cycles, the present being a division of my original application filed October 10, 1898, Serial No. 693,117.

One object of the present invention is to provide a mechanism of the general character of that above indicated with a positively-controlled shiftable driving or actuating clutch element which is positively movable out of as well as into actuating position.

A further object is to provide a mechanism of the general character of the present with a driving or actuating clutch device which is laterally shiftable into and out of operative position—*i. e.*, a clutch device which moves bodily toward one side or the other of the position previously occupied by it.

A further object is to provide a mechanism of such character that the cycle can be freely wheeled backwardly notwithstanding the fact that it can be driven forwardly, can move forwardly freely and independently of its driving means, and can also have its brake operated through the agency of the driving element.

A further object is to provide a driving, coasting, and braking mechanism for bicycles and similar vehicles, such mechanism being controlled by the rider through the pedals, being of simple form and arrangement, efficient and certain in action, and being so constructed that it can be readily incorporated in bicycles already made or can be embodied in bicycles during the process of manufacture.

A further object is to greatly strengthen the construction of devices of the character of the present and provide a structure in which the connections between the driver and the hub and also between the driver and the brake mechanism will be relieved of the element of weakness which is generally present in the devices of the prior art.

A further object is to so construct the mechanism that the shifting of the pressure on the pedals to secure the driving or forward propulsion of the wheel or the application of the brake, as the case may be, will always require the exercise of some appreciable degree of force, so that the pedals will not be loose and disconnected and capable of free or loose play or action, thus greatly adding to the rider's feeling of security.

To these ends and also to improve generally upon mechanisms of the character indicated the invention consists in the various matters hereinafter described and claimed.

In the accompanying drawings, Figure 1 is a side elevation of a portion of a bicycle equipped with the present mechanism. Fig. 2 is a longitudinal sectional elevation through the hub of the bicycle, the view being taken on about the line 2 2 of Fig. 1. Fig. 3 is a transverse sectional elevation on about the line 3 3 of Fig. 2 looking toward the left in said last-mentioned figure. Fig. 4 is a perspective view of the sleeve which is connected to the driver. Fig. 5 is a sectional elevation of the laterally-shiftable rotative clutch-connector. Fig. 6 is a perspective view of a portion of the brake-actuating mechanism. Fig. 7 is a perspective view of the frictional spring which is carried by the before-mentioned shiftable clutch-connector. Fig. 8 is a perspective view of the before-mentioned shiftable clutch-connector modified by the addition of exterior oil grooves or ducts.

In the embodiment of my invention illustrated in the accompanying drawings, A represents the hub or rotatable propelling device of the driving-wheel of the vehicle, shown in Fig. 1 as being the rear wheel of a bicycle, the hub A being provided with means such as the radially-projecting lugs *a*, to which the spokes of the wheel are connected. As usual in devices of this character, this hub A is supported upon an axle B, which is mounted in the rear forks or frame of the bicycle in any usual or preferred manner.

For the purpose of propelling the wheel and for actuating the brake there is provided a suitable driver, shown in Figs. 1 and 2 as a sprocket-wheel C', having the usual sprocket-teeth adapted to be engaged by a chain from a sprocket-wheel on the pedal or crank-shaft of the bicycle. (Not shown.) Manifestly when used upon so-called "chainless" bicycles a bevel or other appropriate gear can be substituted for the illustrated sprocket-wheel C'.

The driver is normally disconnected from the hub and brake mechanism, and by means of the devices which will be disclosed the rotation of the driver from right to left, as illustrated in Fig. 1 of the drawings, positively connects it to the hub to rotate the hub in the same direction, thus imparting a forward propulsion to the wheel, and the backward turning of the driver connects it to the brake-actuator to apply the brake. This mechanism, as here illustrated, comprises a sleeve C, which is connected with the driver and which extends laterally therefrom within the hub, the driver and the sleeve constituting a driving device. While said sleeve can be formed integral with said driver or sprocket, it is, for convenience in manufacture, preferably formed separate therefrom, as shown. It is preferably provided at one end with the outwardly-flaring cone-shaped portion $c'$ and with the external screw-thread $c^2$, upon which the driver or sprocket-wheel C' is turned, such driver fitting closely against the shoulder formed on the flaring end of the sleeve C, as shown clearly in Fig. 2. The driver C' is preferably fastened in position by an outer check-nut $C^2$, which is turned onto the threaded flange of the sleeve against the outer face of the driver.

Upon the shaft B is screwed a cone $b$, the inner end of which forms one member of a ball-race, the other member thereof being formed by the inner cup-like surface $c^3$ of the flaring end of the sleeve C, and in the race thus formed are placed the balls $C^3$, forming a ball-bearing for the driver and sleeve.

In order to connect the driver with the hub and brake mechanism, there is provided a clutch mechanism actuated by the driver-sleeve, and through such sleeve forming a strong and positive connection with the driver and hub or brake mechanism, as desired. This clutch mechanism may be of any usual or preferred form, that shown in the drawings comprising a laterally-shiftable connecting device, shown as a removable sleeve D, having suitable clutch-faces, and which by suitable connection with the driver-sleeve is shifted so as to connect said clutch-faces with either a complementary clutch-face of the hub or such a clutch-face of the brake mechanism or to disconnect said clutch-faces, as when it is desired that the wheel travel forward by its own momentum, as in descending a grade or in coasting. Said sleeve D is mounted upon the driver-sleeve C, so that the sleeve D or clutch-connector is rotatable about the actuating device or driver-sleeve C, and said sleeves thus have a limited relative turning movement, and also so that the sleeve D can move longitudinally along the driver-sleeve C, whereby the before-mentioned lateral shifting of said sleeve D or clutch-connector is effected. The relative turning of the driver-sleeve C and the sleeve D causes the lateral shifting movement of the sleeve D. The connection between the sleeves C and D may be of any form capable of producing the desired result, that shown in the drawings being preferred and consisting of a complementary spiral rib or thread $c$ and groove $d$, the rib $c$ being formed on the sleeve C and the groove $d$ in the sleeve D. The arrangement is such that a turning of the driver C' and its laterally-extended actuating device or sleeve C will impart a lateral movement to the sleeve D to the right or left, as the case may be, dependent upon the direction of movement of the driver. In the illustrated embodiment of the invention a turning of the driver C' and sleeve C from right to left, as shown in Fig. 1 of the drawings, will cause the sleeve D to be moved toward the right, as shown in Fig. 2, such a movement serving to couple the sleeve D with the hub of the wheel, and thus coupling the driver and hub for a forward propulsion of the wheel.

The clutch for coupling the sleeve D and the hub may be of any desired form, that shown consisting of one portion of the sleeve D, constituting the part $d^3$, which has a tapered or inclined face formed on its outer surface and arranged to engage a correspondingly-inclined interior face of a clutch element or socket E, carried by the hub A. The clutch-socket E may be formed integrally with the hub; but, if desired, for convenience of manufacture or for other purpose it can be formed separate, as shown, and provided at its outer end with an external screw-thread $e$, arranged to engage an internal mating screw-thread formed on the hub A. At its outer end the clutch-socket E is preferably formed with a ball-cup $e'$, which coöperates with the outer inclined surface of the flaring end $c'$ of the sleeve C in producing a race for the balls $C^4$, forming one of the ball-bearings for the hub A.

From the foregoing it will be noted that a turning of the driver C' from right to left, as shown in Fig. 1, will cause the complementary spiral connection between its sleeve C and the sleeve D to move said sleeve D, and consequently said part $d^3$, toward the right and force the tapered part $d^3$ into the clutch-socket E, thus coupling the driver C' with the hub A and imparting a forward propulsion to the wheel. So long as the driver is turned in the direction indicated at sufficient speed the wheel will be driven forwardly.

If the rider desires to coast, he simply ceases to turn the pedals, and thus stops the forward turning of the driver C' and the sleeve C, whereupon the momentum of the wheel will cause the hub to turn relatively to the sleeve C, and the clutch-socket E will turn the sleeve D relatively to the sleeve C. This turning of the sleeve D relatively to the sleeve C causes said sleeve D to be moved toward the left until the sleeve D, and consequently the part $d^3$, is out of engagement with the clutch-socket E, thus disconnecting the hub A from the driver and permitting a free rotation of the wheel and hub in a forward direction, which may continue until the momentum of the wheel is exhausted or until the rider again desires to positively propel the wheel.

As before stated, the device of the drawings embodies a brake mechanism, which is designed to be actuated by the driver when said driver is moved in the opposite direction to that in which it is moved for propelling the wheel—i. e., when back pressure is applied to said driver, as in so-called "back-pedaling." This brake mechanism is here shown as located at the opposite end of the hub A from the before-mentioned driver and as comprising a split ring K, of resilient material, which is mounted in a fixed position upon a suitable support or anchoring device, shown as a disk I, provided with a threaded aperture and screwed upon the axle B within the frame of the bicycle, said disk being held from turning by means of a strap or band I', connected to the frame of the bicycle, and an arm $i$ of the disk I. Upon its inner face the disk I is provided with lugs $i'$, $i^2$, and $i^3$, which at their inner ends are preferably provided with vertical ribs or projections (see Fig. 2) arranged to take into an interior groove $k$, formed in the brake-ring K.

The brake-ring K is designed to be expanded and brought into frictional engagement with a brake flange or drum H, carried by the wheel-hub A, such brake-drum in the illustrated embodiment of the present invention being formed separately from the hub and provided with an exteriorly-screw-threaded boss $h$, arranged to engage interior screw-threads on the hub A.

The lug $i^3$ is provided with a projection $i^4$, against which the rear end of the split brake-ring K fits and is thus prevented from rotary movement, said brake-ring being expanded by moving its forward end away from its rear end by suitable mechanism. This mechanism, as illustrated in the drawings, comprises a lever L, which is provided with a rounded portion $l$, arranged to fit between the concave faces of the lugs $i^2$ and $i^3$, and by means of which said lever is supported and permitted to swing. The upper end of the lever L is provided with a projection $k^3$, which engages the forward end of the brake-ring K, and the lower end of said lever is in engagement at $f^2$ with a rocking brake-actuator F, mounted to turn on the shaft B.

The rocking brake-actuator F is provided with a groove $f$, forming one member of a ball-race, the other member of said race being formed on the brake-drum H, and said race receives the balls $C^5$, forming one of the ball-bearings for the hub A.

A turning of the rocking actuator F from right to left as the device is shown in Fig. 3 will cause the lever L to be rocked in the direction to move the forward end of the brake-ring away from its rear end, thus expanding said brake-ring and causing it to engage the brake-drum H, thus retarding or stopping the wheel. The rocking actuator F is rocked when back pressure is imparted to the driver C' through the pedals, as described, and upon such back pressure taking place the driver is connected with the rocking actuator by the laterally-shifting sleeve D.

The sleeve D and the rocking actuator F are provided with a suitable clutch whereby said sleeve D may be connected with the rocking actuator, and thus connect said rocking actuator with the driver to permit the brake to be operated by the driver. This clutch, as here shown, consists of one portion of the sleeve D, constituting the part $d^4$, which has a tapered surface substantially like the tapered surface on the opposite end of the sleeve D, and a clutch-socket G, having a corresponding interior tapered surface and connected to the rocking-actuator. The clutch-socket G can, if desired for convenience of manufacture or for other purpose, be formed separate from the rocking-actuator, as shown, and secured thereto by the threaded connection $g^2$ and stop-nut $g$.

The above arrangement is such that back pressure upon the driver C' will cause the sleeve C, by means of the complementary spiral connection between said sleeve and the sleeve D, to move said sleeve D, and consequently the part $d^4$, toward the left as the invention is illustrated in Fig. 2 and force the said tapered part $d^4$ into the clutch-socket G, thus connecting the driver C' with the rocking actuator of the brake mechanism, and the turning or rocking of said actuator causes the lever L to expand the brake-ring K to bring it in contact with the brake-drum of the wheel-hub to retard or stop the wheel. As soon as pressure is relieved from the free end of the brake-ring, as when the backward pressure upon the pedals of the bicycle is relieved, said brake-ring contracts, and thus moves out of braking engagement with the drum H, whereby the wheel is freed from the braking action.

It will be noted that in the mechanism here illustrated the brake, when no force is being applied thereto, is in retracted inoperative position in which it does not affect the wheel. Furthermore, the wheel has no operative connection with the brake-applying mechanism and also is never connected to the driver except when the sleeve D is positively moved by the operation of the driver into wheel-driving position, so that said wheel has no connections by means of which it can move the brake from its normal retracted position. Also the driver itself is not in operative connection with the brake except when the sleeve D is positively shifted into engagement with the brake-clutch. Therefore, normally the brake is in inoperative position, the wheel is disconnected from the brake, and the driver is disconnected from both the wheel and the brake, and in the said illustrated mechanism the driver can obtain connection with either the wheel or the brake only by positively shifting the connector-sleeve D by power designedly applied thereto for such shifting purpose. Therefore the hub of the wheel is free to turn in both directions without operating the brake mechanism, thus permitting the bicycle or other vehicle to be moved backward over the ground without affecting the brake, whereas in those devices employing gravity-pawls, ball clutches, and the like a slight movement of the wheel of the bicycle backwardly causes the brake mechanism to be brought into action. I believe that I am the first to provide a driving, coasting, and braking mechanism which permits the driving-wheel to be freely wheeled backwardly and that I am also the first to provide a positively-actuated connecting device controlled by the driver for connecting the driver with the hub or brake, producing the result above stated, and I desire it to be understood that while I prefer the illustrated and described embodiment of my invention it is not limited thereto.

It will be noted that the lateral movement of the sleeve D is produced by a preliminary relative turning of said sleeve and the sleeve C, and for the purpose of more positively insuring such preliminary relative turning and also for the purpose of insuring that the change of pressure on the pedals to shift from a driving to a braking action shall always require some appreciable force and, further, that a loose and free movement of the pedals cannot occur during the operation of coasting I have provided means for opposing the free operation of the driver-sleeve, this means being here shown as a frictional device which is arranged to frictionally connect the laterally-shifting sleeve D with the hub or with the brake mechanism and to frictionally engage one of these elements before entirely releasing the other. This friction device in the illustrated embodiment of the present invention consists of a split spring-band M, which is fixed, as by means of rivets $m$, to an intermediate collar $d^2$, formed on the outer surface of the sleeve D in position to engage the inner ends of the hub-clutch socket E and the brake-clutch socket G. The described arrangement is such that when the parts are in the driving position shown in Fig. 2 the spring-band M is in engagement with the clutch-socket E, and upon backward turning of the driver, although permitting lateral movement of the sleeve D, said band restrains said sleeve D from turning backwardly with the sleeve C until the relative movement between the sleeves C and D has been sufficient to shift said sleeve D laterally to connect it with the clutch-socket G of the brake mechanism, at which time the spring-band M will have engaged the clutch-socket G.

It may be desirable in some cases to provide the complementary tapered clutch-faces with oil-grooves—such, for instance, as is shown in Fig. 8.

I have in the foregoing specification described the present invention as it is illustrated in the accompanying drawings, and such is a preferred construction. I, however, desire it to be distinctly understood that the present invention is not limited to the details of construction which have been set forth, as it is obvious that many changes might suggest themselves to the skilled mechanic without departing from the spirit and scope of my invention.

I do not herein make claim to the particular brake herein disclosed, its supporting means, or the connections between the brake and the hereinabove-mentioned brake clutch, as such subject-matter is included in the scope of my said original application, of which the present is a division.

Having thus described my invention, what I claim as new, and desire to protect by Letters Patent of the United States, is—

1. A driving, coasting and braking mechanism for vehicles, comprising a driver, a brake normally in inoperative position, a wheel which, when said driver is in normal position free from control of the operator, is operatively disconnected from said driver and said brake and is free to rotate independently forwardly and backwardly, and means whereby movement of said driver in one direction causes said driver to drive said wheel and movement of said driver in the opposite direction causes said driver to apply said brake; substantially as described.

2. The combination with a wheel, a brake therefor, and a driver, said wheel being, when said driver is in normal position free from control of the operator, free to rotate forwardly and backwardly independently of said driver and said brake, of clutch devices for operatively connecting said driver to said wheel and for permitting said driver to apply said brake, and means whereby said clutch devices are, only upon a positive turning movement of said driver, operable to effect braking action of said driver and to effect operative connection between said driver and said wheel; substantially as described.

3. In a device of the character indicated, the combination with a driven wheel, a brake therefor, and a driving element with relation to which said wheel can independently rotate, of a laterally-shiftable member adapted in one position to drive said wheel and in another position to apply said brake, and means for laterally shifting said member by said driving element; substantially as described.

4. The combination with a wheel-hub and brake, of a driver for the hub and brake normally disconnected therefrom, and a laterally-shiftable connecting device actuated by the driver for connecting said driver with the hub or brake; substantially as described.

5. The combination with a wheel and its rotatable propelling device provided with an interior clutch member, of a laterally-shiftable sleeve provided with a complementary clutch member, a rotatable driver provided with a laterally-extended actuating device projected into the laterally-shiftable sleeve, and suitable connections between the actuating device and sleeve for shifting the sleeve laterally to connect and disconnect said clutch members; substantially a described.

6. The combination with a wheel-hub, of a brake device located at one end of the hub, a driver for the hub and brake located at the opposite end of the hub, and a laterally-shiftable connecting device for connecting the driver with the hub or with the brake device; substantially as described.

7. The combination with a wheel and a brake for retarding the movement of the same, of a driver, a laterally-shiftable connector, means for shifting said connector laterally upon operation of said driver, means located at one side of said connector for connecting the same with said wheel, and means located at the opposite side of said connector for connecting the same with said brake; substantially as described.

8. The combination with a wheel-hub, of a brake, a driver for the hub and brake, a sleeve connected with the driver, a laterally-shiftable connecting device for connecting the driver with the hub or brake, and connections between the driver-sleeve and the connecting device for shifting the connecting device to connect the driver with the hub or brake or to disconnect it from both; substantially as described.

9. The combination with a wheel-hub, of a brake, a driver for the hub and brake, a sleeve connected with the driver, a laterally-shiftable sleeve mounted on the sleeve of the driver, connections between said sleeves arranged to laterally shift the shifting sleeve when the sleeve of the driver is turned, and means for connecting the laterally-shiftable sleeve with the hub or brake according to the direction in which it is shifted; substantially as described.

10. The combination with a wheel and a brake for retarding the movement of the same, of a driver, a laterally-shiftable connector rotatable with respect to said driver and having threaded connection therewith, means located at one side of said connector for connecting the same with said wheel, and means located at the opposite side of said connector for connecting the same with said brake; substantially as described.

11. The combination with a wheel and a brake for retarding the movement of the same, of a driver, a laterally-shiftable connector rotatable upon said driver and detachable therefrom, means whereby rotation of said driver serves to shift said connector laterally, means located at one side of said connector for connecting the same with said wheel, and means located at the opposite side of said connector for connecting the same with said brake; substantially as described.

12. The combination with a wheel and its rotatable propelling device, of a rotatable driver having a threaded part projecting within said propelling device, a laterally-shiftable connector rotatable upon said threaded part and receiving the thread thereof, a brake for retarding the movement of said wheel, means located at one side of said connector for connecting the same with said wheel, and means located at the opposite side of said connector for connecting the same with said brake; substantially as described.

13. In a bicycle, the combination with a wheel-hub, of a brake mechanism located at one end of the hub, a driver for the hub and brake mechanism located at the opposite end of the hub, a rotatable sleeve connected with the driver and extended within the hub, a laterally-shiftable sleeve mounted upon the driver-sleeve and having oppositely-disposed clutch-faces, a complementary spiral connection between the sleeves, and clutch-faces on the hub and brake mechanism arranged to be engaged by the clutch-faces of the sleeves; substantially as described.

14. The combination with a wheel-hub and a brake, of a driver for the hub and brake, a laterally-shiftable connecting device for connecting the driver with the hub or brake, means whereby a relative turning of the driver and the laterally-shiftable connecting device will impart a lateral movement to said connecting device to connect the driver with the hub or brake, and means for insuring the relative turning of the driver and laterally-shiftable connecting device; substantially as described.

15. The combination with a wheel-hub and a brake, of a driver for the hub and brake, a laterally-shiftable rotative connecting device for connecting the driver with the hub or brake, means whereby a relative turning of the driver and the laterally-shiftable connecting device will impart a lateral movement to said connecting device to connect the driver with the hub or brake, and means for retarding the rotation of the laterally-shiftable rotative connecting device to insure the relative turning of the driver and said connecting device; substantially as described.

16. A mechanism comprising a plurality of elements, one of which is capable of independent movement relative to the other, a braking mechanism, means for connecting and disconnecting one of the elements and the braking mechanism, and means adapted to engage a portion of the braking mechanism and the first-named means for resisting the operation of said first-named means; substantially as described.

17. A mechanism comprising a plurality of elements, one of which is capable of movement relative to the other, a braking mechanism for one of the elements, means for connecting and disconnecting one of the elements with the other or with the braking mechanism, and means carried by said first-named means and capable of engagement with one of the elements and with the braking mechanism for opposing the movement of said first-named means; substantially as described.

18. The combination with a wheel-hub provided with an interior tapered clutch-socket, of a laterally-shiftable sleeve provided with a correspondingly-tapered portion, a rotatable driver provided with a laterally-extended actuating device projected into the laterally-shiftable sleeve, and suitable connections between the actuating device and sleeve for shifting the sleeve laterally to connect said sleeve with or disconnect it from the clutch-socket according to the direction of rotation of the driver; substantially as described.

19. In a bicycle, the combination with a wheel hub and axle, of a brake mechanism, a driver for the hub and brake mechanism, a rotatable sleeve connected with the driver and mounted upon the axle within the hub, a laterally-shiftable rotatable sleeve mounted upon the sleeve of the driver and having tapered portions, a complementary spiral connection between said sleeves, and tapered clutch elements carried by the hub and brake mechanism with which the tapered portions of the shiftable sleeve may engage; substantially as described.

20. In a bicycle, the combination with a wheel-hub and a brake, of a driver for the hub and brake, clutch devices actuated by the driver for connecting said driver with the hub or brake or for disconnecting it from both, and a friction device acting upon the clutch devices for preventing a loose action of said driver; substantially as described.

21. The combination with a wheel-hub and brake, of a driver having a sleeve mounted on the axle within the hub, a laterally-shiftable connecting device mounted upon said sleeve, means whereby a relative turning of the sleeve and connecting device will shift the connecting device laterally to connect said device with the hub or brake actuating mechanism, and a friction device carried by the connecting device arranged to engage the hub or brake actuating mechanism to insure the relative turning of the sleeve and connecting device; substantially as described.

22. In a bicycle, the combination with a wheel-hub, of a brake mechanism, a driver for the brake mechanism and hub, a sleeve connected to the driver, a laterally-shiftable connecting device mounted on said sleeve and having tapered portions, a spiral connection between the connecting device and sleeve, tapered clutch elements carried by the hub and brake mechanism arranged to be engaged by the tapered portions of the connecting device, and a spring frictionally connecting the connecting device with the clutch elements for insuring a relative turning movement between the sleeve and connecting device; substantially as described.

23. The combination with a wheel-hub and brake, of a driver for said hub and brake, a laterally-shiftable connecting device controlled by the driver and having tapered portions, clutch elements carried by the brake and hub arranged to be engaged by the tapered portions of the connecting device, and oil grooves or ducts formed in the tapered surface of the connecting device; substantially as described.

24. The combination with a wheel-hub and a brake for retarding the movement of the wheel, of a driver at said hub, means for operatively connecting said driver and hub for driving the latter, and means for operating said brake through backward movement of said driver, said brake-operating means including a surface upon said driver for producing lateral thrust and laterally inclined with respect to the longitudinal axis of said hub, and a laterally-shiftable brake-operating part upon which said inclined surface operates; substantially as described.

25. A driving, coasting and braking mechanism for vehicles, comprising the combination with a wheel, a brake therefor, and a driver with relation to which said wheel can independently rotate, of a brake-anchoring device anchored to a relatively stationary structural element of the vehicle, a laterally-shiftable connector which in one position operatively connects said driver with said wheel for driving the latter and in another position permits said driver to apply said brake, said connector having rotary movement with respect to said driver and said wheel being rotatable with respect to said connector, and means for laterally shifting said connector upon movement of said driver; substantially as described.

26. A driving, coasting and braking mechanism for vehicles, comprising the combination with a wheel, a brake therefor, and a driver with relation to which said wheel can independently rotate, of a brake-anchoring device anchored to a relatively stationary structural element of the vehicle, a laterally-shiftable connector which in one position operatively connects said driver with said wheel for driving the latter and in another position permits said driver to apply said brake, said connector having rotary movement with respect to said driver and said wheel being rotatable with respect to said connector, and threaded operating connection between said driver and said connector; substantially as described.

27. A driving, coasting and braking mechanism for vehicles, comprising the combination with a wheel, a brake therefor, and a driver with relation to which said wheel can independently rotate, of a brake-anchoring device anchored to a relatively stationary structural element of the vehicle, a laterally-shiftable connector which in one position operatively connects said driver with said wheel for driving the latter and in another position permits said driver to apply said brake, said connector having rotary movement with respect to said driver and said wheel being rotatable with respect to said connector, threaded operating connection between said driver and said connector, and means for yieldingly holding said connector against rotation with said driver; substantially as described.

28. A driving, coasting and braking mechanism for vehicles, comprising the combination with a wheel, a brake therefor, and a driver with relation to which said wheel can independently rotate, of a brake-anchoring device anchored to a relatively stationary structural element of the vehicle, a laterally-shiftable threaded connector with respect to which said wheel is rotatable, a threaded part upon said driver and telescoping with said connector, the threads of said threaded part coöperating with the threads of said connector, whereby said connector has rotary movement with respect to said driver, means whereby when said connector is in one position it is operatively connected with said wheel, and means whereby when said connector is in another position movement of said driver effects application of said brake; substantially as described.

29. A driving, braking and coasting mechanism for vehicles, comprising a wheel-hub, a brake therefor housed by said hub, an anchor for said brake anchored to a relatively stationary structural element of the vehicle, a driving-gear adjacent said hub and with relation to which said hub can rotate independently, a threaded part upon said driving-gear and projecting within said hub, a laterally-shiftable connector within said hub and with relation to which said hub is rotatable, said connector telescoping with said threaded part and having threads coöperating with the same, whereby said connector has rotary movement with respect to said driving-gear, means whereby when said connector is in one position it serves to operatively connect said driving-gear with said hub for driving the latter, and means whereby when said connector is in another position it permits said driving-gear to apply said brake; substantially as described.

30. A driving, braking and coasting mechanism for vehicles, comprising a wheel-hub, a brake therefor housed by said hub, an anchor for said brake anchored to a relatively stationary structural element of the vehicle, a driving-gear adjacent said hub and with relation to which said hub can rotate independently, a threaded part upon said driving-gear and projecting within said hub, a laterally-shiftable connector within said hub and with relation to which said hub is rotatable, said connector telescoping with said threaded part and having threads coöperating with the same, whereby said connector has rotary movement with respect to said driving-gear, means whereby when said connector is in one position it serves to operatively connect said driving-gear with said hub for driving the latter, means whereby when said connector is in another position it permits said driving-gear to apply said brake, and means for yieldingly holding said connector against rotation with said driving-gear; substantially as described.

31. A driving, coasting and braking mechanism for vehicles, comprising the combination with a wheel, a brake therefor, and a driving device including a gear adjacent said wheel and with relation to which said wheel can independently rotate, of a brake-anchoring device anchored to a relatively stationary structural element of the vehicle, a laterally-shiftable part which in one position permits said driving device to apply said brake and in another position permits said brake to be in inoperative position, said wheel being rotatable with respect to said part, means for laterally shifting said part upon movement of said driving device, and means for connecting said driving device to said wheel for driving the latter; substantially as described.

32. A driving, coasting and braking mechanism for vehicles, comprising the combination with a wheel, a brake therefor, and a driving device including a gear adjacent said wheel and with relation to which said wheel can independently rotate, of a brake-anchoring device anchored to a relatively stationary structural element of the vehicle, a laterally-shiftable part which in one position permits said driving device to apply said brake and in another position permits said brake to be in inoperative position, said wheel being rotatable with respect to said part and said part having rotary movement with respect to said driving device, complementary inclined surfaces between said driving device and said part for shifting said part upon movement of said driving device, and means for connecting said driving device to said wheel for driving the latter; substantially as described.

In testimony whereof I hereunto affix my signature in the presence of two witnesses.

HARRY POND TOWNSEND.

Witnesses:
JOHN D. BLAIR,
BERTHA WILLIAMS BUNNELL.

---

Corrections in Letters Patent No. 850,077.

It is hereby certified that in Letters Patent No. 850,077, granted April 9, 1907, upon the application of Harry Pond Townsend, of New Britain, Connecticut, for an improvement in "Driving and Braking Mechanism for Cycles," errors appear in the printed specification requiring correction, as follows: In line 51, page 2, the period after the word "driver" should be stricken out, and in line 15, page 5, the article *a* should be inserted before the first occurrence of the word "brake"; and that the said Letters Patent should be read with these corrections therein that the same may conform to the record of the case in the Patent Office.

Signed and sealed this 7th day of May, A. D., 1907.

[SEAL.]

E. B. MOORE,
*Acting Commissioner of Patents.* ing device anchored to a relatively stationary structural element of the vehicle, a laterally-shiftable part which in one position permits said driving device to apply said brake and in another position permits said brake to be in inoperative position, said wheel being rotatable with respect to said part and said part having rotary movement with respect to said driving device, complementary inclined surfaces between said driving device and said part for shifting said part upon movement of said driving device, and means for connecting said driving device to said wheel for driving the latter; substantially as described.

In testimony whereof I hereunto affix my signature in the presence of two witnesses.

HARRY POND TOWNSEND.

Witnesses:
JOHN D. BLAIR,
BERTHA WILLIAMS BUNNELL.

---

It is hereby certified that in Letters Patent No. 850,077, granted April 9, 1907, upon the application of Harry Pond Townsend, of New Britain, Connecticut, for an improvement in "Driving and Braking Mechanism for Cycles," errors appear in the printed specification requiring correction, as follows: In line 51, page 2, the period after the word "driver" should be stricken out, and in line 15, page 5, the article *a* should be inserted before the first occurrence of the word "brake"; and that the said Letters Patent should be read with these corrections therein that the same may conform to the record of the case in the Patent Office.

Signed and sealed this 7th day of May, A. D., 1907.

[SEAL.]

E. B. MOORE,
*Acting Commissioner of Patents.*

It is hereby certified that in Letters Patent No. 850,077, granted April 9, 1907, upon the application of Harry Pond Townsend, of New Britain, Connecticut, for an improvement in "Driving and Braking Mechanism for Cycles," errors appear in the printed specification requiring correction, as follows: In line 51, page 2, the period after the word "driver" should be stricken out, and in line 15, page 5, the article *a* should be inserted before the first occurrence of the word "brake"; and that the said Letters Patent should be read with these corrections therein that the same may conform to the record of the case in the Patent Office.

Signed and sealed this 7th day of May, A. D., 1907.

[SEAL.]

E. B. MOORE,
*Acting Commissioner of Patents.*